United States Patent [19]

Horike et al.

[11] 4,418,352

[45] Nov. 29, 1983

[54] INK JET PRINTING APPARATUS

[75] Inventors: Masanori Horike; Yutaka Ebi, both of Tokyo, Japan

[73] Assignee: Ricoh Company, Ltd., Tokyo, Japan

[21] Appl. No.: 376,883

[22] Filed: May 10, 1982

[30] Foreign Application Priority Data

May 18, 1981 [JP] Japan .................................. 56-74478
May 18, 1981 [JP] Japan .................................. 56-74479
May 18, 1981 [JP] Japan .................................. 56-74480

[51] Int. Cl.³ .............................................. G01D 18/00
[52] U.S. Cl. .................................. 346/75; 346/140 R
[58] Field of Search ....................... 346/1.1, 75, 140 R

[56] References Cited

U.S. PATENT DOCUMENTS 3,465,351 9/1969 Keur et al. ............................ 346/75
3,969,733 7/1976 De Moss et al. ................. 346/75 X
4,370,664 1/1983 Horika et al. ......................... 346/75
4,374,387 2/1983 Iyoda et al. ........................... 346/75

FOREIGN PATENT DOCUMENTS 56-24175 3/1981 Japan ..................................... 346/75

*Primary Examiner*—Joseph W. Hartary
*Assistant Examiner*—D. Jennings
*Attorney, Agent, or Firm*—David G. Alexander

[57] ABSTRACT

An ink jet printing apparatus uses as its charge detection means a gutter which is made of a conductive material, insulated from collected ink and grounded through a resistor. A charging electrode is supplied with charging voltage pulses for a phase search intermittently at a predetermined period which is at least two times the period of a drive frequency of ink droplets. The resultant voltage appearing across the resistor is amplified and filtered to pick out a pulse signal of the predetermined period. The resistance of the resistor between the gutter and the ground is preselected to be sufficiently smaller than that of the ink.

14 Claims, 21 Drawing Figures

| Fig. 13a | Fig. 13b |
| --- | --- |

INK JET PRINTING APPARATUS

BACKGROUND OF THE INVENTION

The present invention relates to an ink jet printing apparatus which includes a nozzle for ejecting an ink under supersonic vibration, a charging electrode located in a position where the jet of ink separates into droplets so as to selectively charge the droplets and a deflection electrode deflecting charged ink droplets to cause them to impinge on a sheet of paper. More particularly, the present invention is concerned with an ink jet printing apparatus of the type which employs a gutter as an electrode for detecting deposition of a charge on an ink droplet.

An ink jet printer of the type described has a pump which pumps an ink from an ink reservoir through a filter into an accumulator adapted to smooth the input ink pressure. The accumulator supplies the ink under pressure to an ink jet head which imparts a predetermined frequency of vibration to the ink with an electrostrictive vibrator incorporated therein. The ink under the vibration is ejected from a nozzle of the head. At a position spaced a given distance from the nozzle, the jet of ink is separated into droplets at regular intervals. The period of such separation is equal to the frequency of the vibration generated by the vibrator. A charging electrode is located in a position where the jet of ink separates into droplets. The charging electrode is supplied with a charging voltage whose level varies in steps; which is zero level (e.g. ground level) during a non-printing period (when a video signal is logical "0"). The charging voltage must be fed in a manner of pulses while each step of charging voltage must be impressed in conformity to a certain phase of formation of an ink droplet. To meet these requirements, a phase search is performed to determine the phase of charging voltage pulses relative to that of vibration by the vibrator.

For a phase search, clock pulses are supplied from a clock pulse generator to a drive voltage generator so as to produce a sinusoidal wave synchronous with the clock. The sinusoidal wave is coupled to the electrostrictive vibrator inside the head. The output clock of the clock pulse generator is also supplied to a phase setting circuit to prepare charging clock of a predetermined duration and different in phase from the clock by a predetermined amount. Phase search charging pulses exactly common in phase to the charging clock, identical or opposite in polarity to the charging voltage and having a constant level at all the time are generated by a search signal generator and coupled to the charging electrode via gate and an amplifier. The charge detecting electrode determines whether an ink droplet has been charged. As a charge detection circuit produces a "charge" output before a predetermined number of ink droplets are formed, the phase searching operation is terminated; otherwise, a 1-step phase shift command is fed to the phase setting circuit to shift the charging clock by a given phase relative to the preceding charging clock.

After a proper charging phase of the charging clock has been set up relative to the output clock of the clock pulse generator, a charging signal prepared by a charge signal generator based on the charging clock and having a stepwise level is fed through a gate and an amplifier to the charging electrode. Then, the printer starts its operation in a data reproduction mode. Ink droplets are deposited with charges corresponding to charging voltage levels and are individually deflected by a deflecting electrode in accordance with their specific charges. When the video signal is "0" level, the charging voltage is made zero level whereby ink droplets are collected by the gutter without being charged at all.

Apart from known charge detection electrodes of the cylindrical or U-shaped electrostatic induction type or the type having two flat electrodes adjacent to or opposite to each other, a gutter for collecting ink droplets is usable as such an electrode as disclosed in Japanese Layed Open Patent Application nos. 49-107142/1974 and 55-84680/1980, for example.

In an ink jet printer using a gutter as its charge detecting electrode, the gutter is electrically insulated from ink which has flown downward therefrom into an ink collection system. The gutter is connected with a charge integrating capacitor and a capacitor discharging switch. A voltage charged in the capacitor is amplified and compared with a reference voltage during the phase search mode. A rise of the capacitor voltage beyond a predetermined level within a given period of time indicates that the ink droplets are charged. However, an insulator which supports the insulated gutter becomes spattered with the ink impinged on the gutter resulting in a leak betwen the gutter and the collected ink. This renders the capacitor voltage and, therefore, the charge detection unstable. Particularly, when the spattering or smearing is significant, even a proper charge tends to be identified as a zero charge. Such a problem cannot be settled unless the gutter and its neighborhood is always cleaned at the sacrifice of time and labor. Additionally, due to a frictional charge on ink during ejection from the nozzle and a charge generated by ink upon impingement on the gutter, "charge" signal components unrelated with charging/non-charging of ink droplets by the voltage fed to the charging electrode are introduced into the capacitor as a dc bias to thereby deteriorate the S/N ratio. This unavoidably invites an error unless a larger number of charged droplets are directed to the gutter.

Smearing with ink is the problem also encountered in the case with the electrostatic induction type charge detecting electrode. To prevent introduction of noise, a disproportionately intricate measure is required for processing signals or cutting off noise. This type of detection electrode, in particular, suffers from a drawback that it has to be located somewhere between the charging electrode and the gutter, which increases the distance between the nozzle and the paper sheet. As a result, an ink droplet has to fly a longer distance and, thus, tends to be noticeably dislocated on the paper sheet due to the air resistance, mutual repulsion or attraction between flying ink droplets, charge distortion etc.

The ink fed to the head is usually held at the ground potential, and so is regarded the ink which is wetting the gutter because it is continuous with the ink in the collection system. However, in practice, the resistance of the ink is substantial and the ink in the gutter is sucked by a pump into a collector tank, whereby the ink is discontinued within a collection pipe between the pump and the gutter to increase the gutter-ground resistance to a significant degree. Non-charged ink droplets impinging on the gutter have been charged by the friction at the nozzle or the induction by the adjacent charged droplets, though not positively charged by the charging voltage. The non-charged ink droplets, therefore, shifts the potential on the gutter off the ground level, which in turn disturbs the deflection of charged ink droplets for printing data.

SUMMARY OF THE INVENTION

An ink jet printing apparatus embodying the present invention includes an ink ejection head for ejecting a jet of ink, charging means for electrostatically and selectively charging ink droplets separated from the jet of ink, deflection means for electrostatically deflecting the charged ink droplets, charging pulse generator means for generating charging voltage pulses for a phase search and applying the voltage pulses to the charging means intermittently at a predetermined period, gutter means for catching the charged ink droplets for the phase search, the gutter means comprising a conductive member and resistance means through which the conductive member is grounded, and charge detection means for detecting a voltage appearing across the resistance means at said predetermined period when the charged ink droplets impinge on the conductive member of the gutter means to be discharged through the resistance means.

It is an object of the present invention to provide an ink jet printing apparatus which, despite the use of a gutter as its charge detecting electrode, is capable of detecting deposition of a charge on an ink droplet to unprecedented reliability.

It is another object of the present invention to provide an ink jet printing apparatus which, despite the use of a gutter as its charge detecting electrode, eliminates the instability in the detection of charged ink droplets attributable to smearing of the gutter with ink upon impingement of ink droplets on the gutter.

It is another object of the present invention to provide a generally improved ink jet printing apparatus.

Other objects, together with the foregoing, are attained in the embodiments described in the following description and illustrated in the accompanying drawings.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
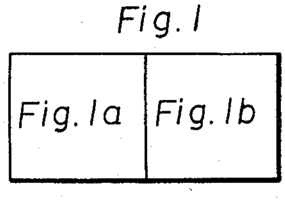
FIG. 1 is a block diagram of an ink jet printing apparatus embodying the present invention.
Figure 1A:
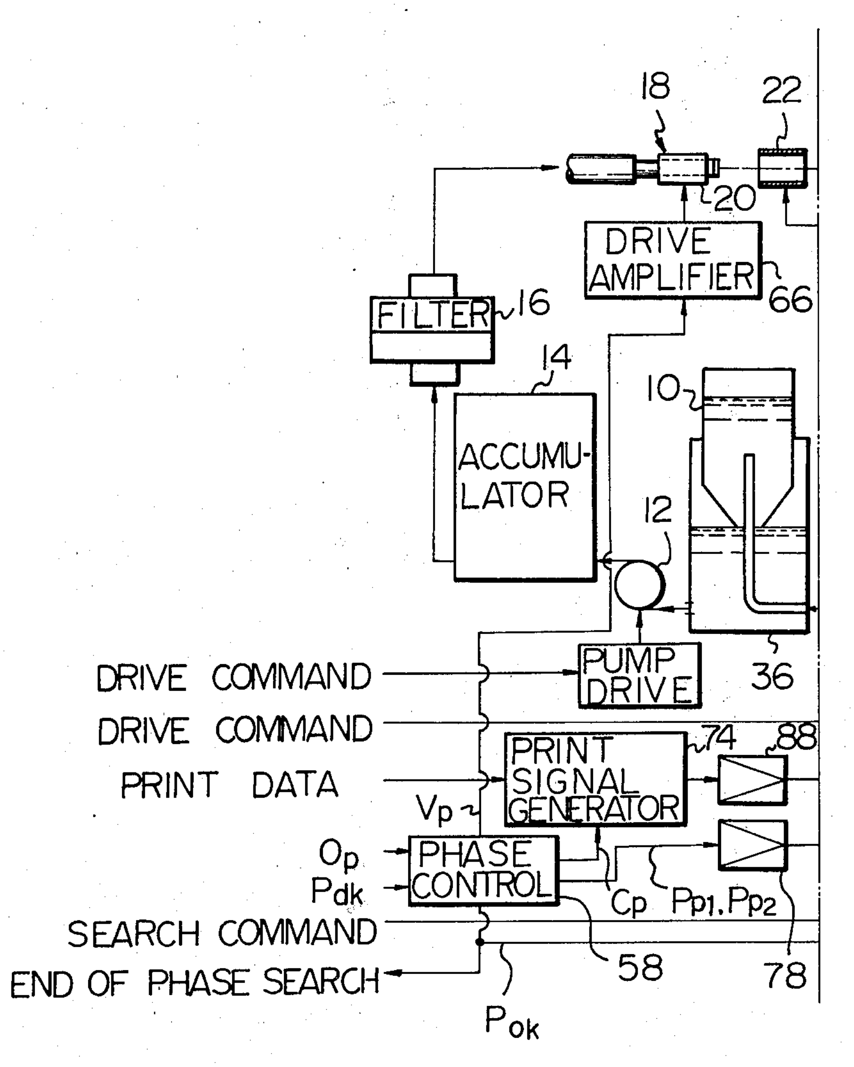
Figure 1B:
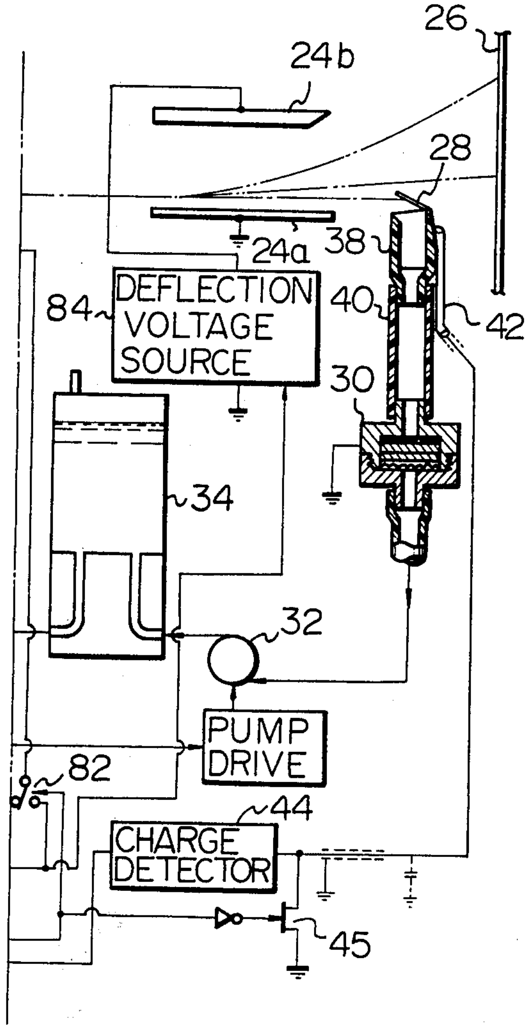

Referring to FIG. 1 of the drawings, an ink jet printing apparatus includes an ink cartridge 10 and a pump 12 for pumping an ink from the cartridge 10 to an accumulator 14. The accumulator 14 delivers the ink under a constant pressure to an ink jet or ejection head 18 via a filter 16. The ink ejection head 18 includes an electrostrictive vibrator 20 which is driven at a predetermined frequency to impart pressure vibration to the ink. Then, the ink ejected from a nozzle of the head 18 separates into a string of droplets at a position spaced a predetermined distance from the nozzle. A charging electrode 22 is located in the position where the separation of the ink occurs, so as to selectively charge each ink droplet to a polarity opposite to that of a voltage applied thereto. Charged ink droplets are deflected by an electric field developed between deflection electrodes 24*a*, 24*b* to impinge on a sheet of paper 26. Non-charged ink droplets, on the other hand, impinge on a gutter 28 and then fall from the gutter 28 drop by drop due to gravity into a filter 30. A pump 32 sucks the ink from the filter 30 into a collector tank 34 and an ink tank 36 in succession. The pump 12 also pumps this part of the ink to the accumulator 14.

The gutter 28 is made of a conductive material and rigidly mounted on a gutter holder 38 which is made of a insulating material. An insulating tube 40 connects the gutter holder 38 to the filter 30. A casing of the filter 30 for storing a filtering member is formed of metal and grounded. The resistance between the gutter 28 and the filter (ground) 30 is measured to lie within the range of 10 MΩ to 100 MΩ when both the gutter holder 38 and tube 40 are wet with ink, while being 100 kΩ or above even when a substantial amount of ink is intentionally allowed to remain. A shielding wire 42 has a core which is connected at one end with the conductive gutter 28 and at the other end with a charge detection circuit 44. The covering of the shielding wire 42 is grounded. The shielding wire 42 has a floating capacity of 100–1000 pF. If desired, the shield core may be grounded through a field effect transistor 45 adapted to ground the gutter 28.

Figure 2:
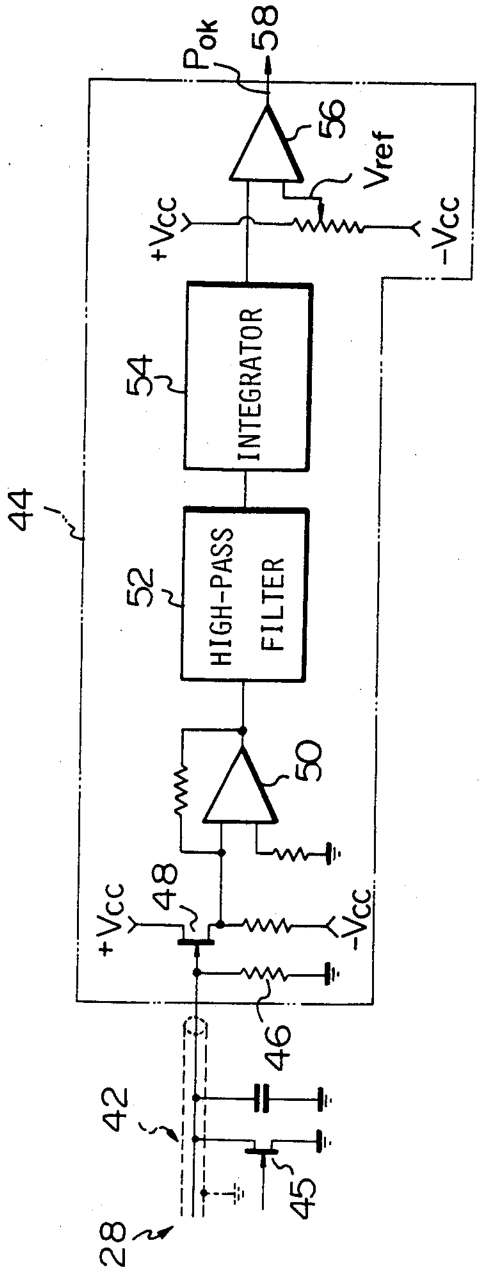
FIG. 2 is a block diagram of an example of a charge detection circuit included in the apparatus of FIG. 1.

Referring to FIG. 2, the charge detection circuit 44 includes a voltage converting resistor 46 which has a resistance $R_C$ smaller than the ink resistance $R_G$ between the gutter 28 and the filter (ground) 30 and nearly equal to 100 kΩ. The resistor 46 functions to free the grounding resistance at the side adjacent to the gutter 28 from instability which would otherwise result from a fluctuation of the resistance $R_G$ due to smearing with ink. The resistor 46 connects to a field effect transistor 48 for impedance conversion which in turn connects to an operational amplifier 50. The operational amplifier 50 connects to a high-pass filter 52 and, therethrough, to an integrator 54 for smoothing a dc component. The integrator 54 connects to a comparator 56.

Figure 3:
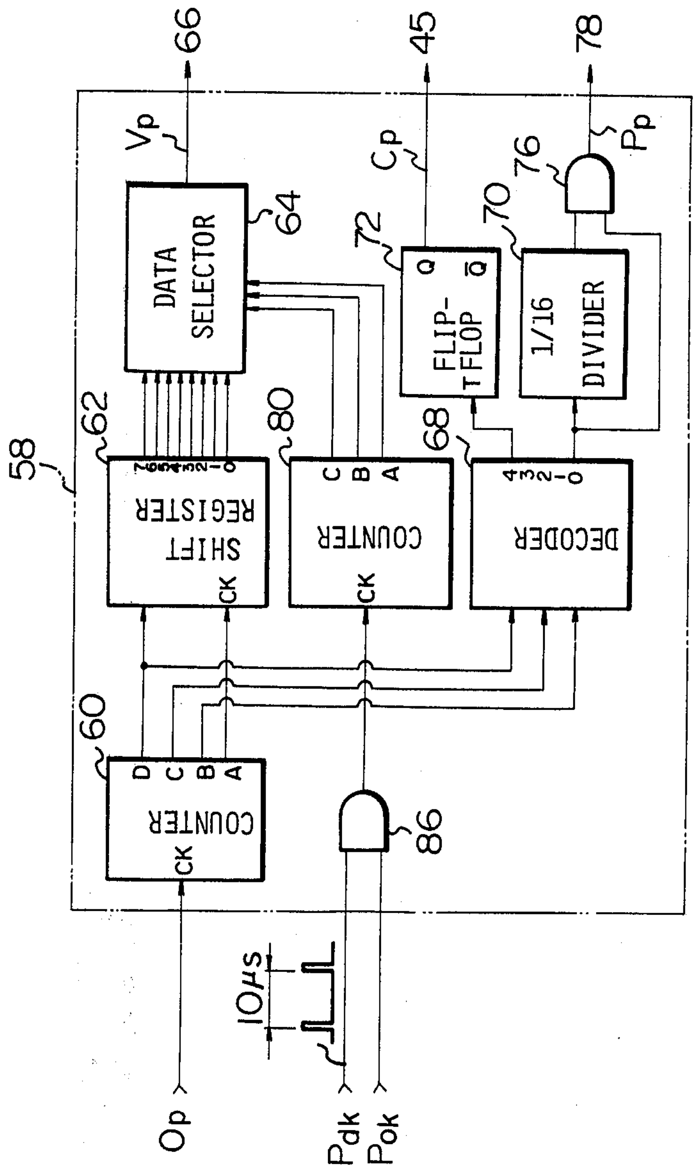
FIG. 3 is a block diagram of an example of a phase control circuit also included in the apparatus of FIG. 1.
Figure 4A:
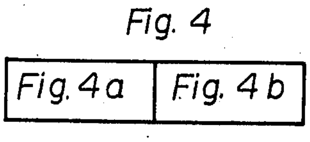
FIG. 4 is a timing chart demonstrating an operation of the phase control circuit shown in FIG. 3.
Figure 4A:
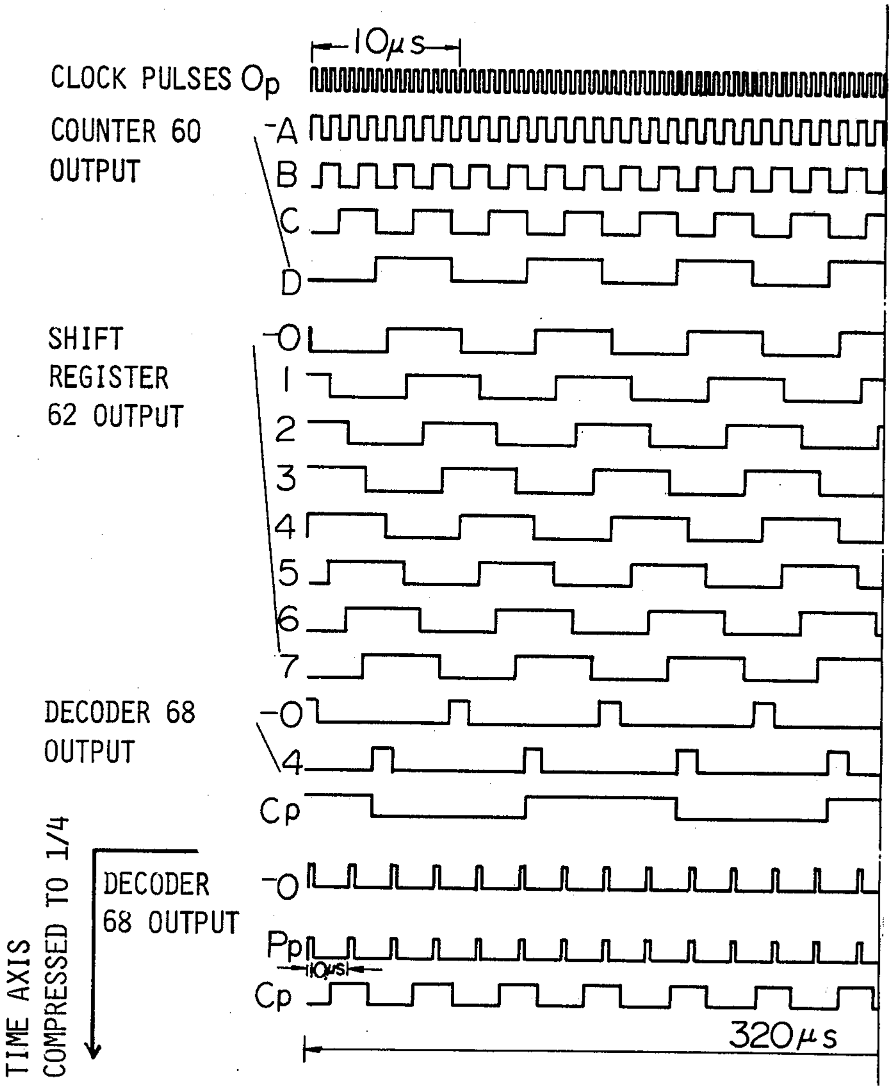
Figure 4B:
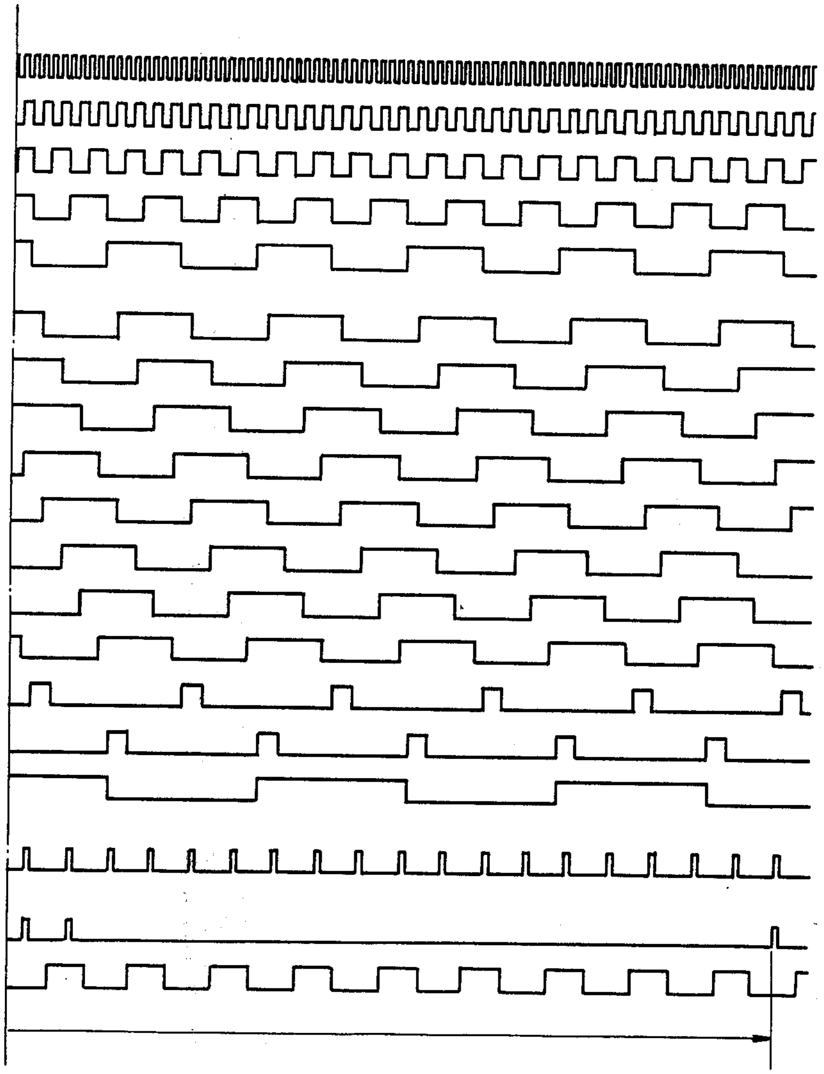

A phase control circuit 58 (FIG. 1) has a construction shown in FIG. 3 and operates in a manner demonstrated in FIG. 4. The phase control circuit 58 is supplied with clock pulses Op whose frequency is 1.6 MHz. These input pulses Op are countered by a counter 60 which produces a count code having a set of bits A-D (A=1st digit, . . . , D=4th digit). Of these bits, the A bit is fed as a shift pulse to a serial-in, parallel-out shift register 62 while the D bit is coupled thereto as an input signal. Pulses appearing at output terminals 0-7 of the shift register 62 are, therefore, sequentially deviated in phase each by the frequency of the shift pulses A and provided with a duration common to that of the D output bits of the counter 60. One of the register outputs is coupled as a vibrator drive pulse Vp through a data selector 64 to a drive amplifier circuit 66 (FIG. 1).

The B-D bits of the counter 60 are supplied to a decoder 68 which then supplies pulses appearing at its first output terminal 0 and fifth output terminal 4 to a frequency divider 70 and a T-type flip-flop 72, respectively. The Q output of the flip-flop 72 is fed as a charge timing signal Cp to a print signal generation circuit 74. The pulse divided to 1/16 by the frequency divider 70 and shaped by an AND gate 76 to the duration of the 0 terminal output pulse of the decoder 68 is coupled to a charge amplifier 78 (FIG. 1) as a phase search charging pulse Pp. As shown in FIG. 4, a train of sixteen successive pulses Pp are followed by an interruption corresponding to the same number of pulses and repeatedly appear at a period of 320 μsec, for example. The charge timing signal Cp, on the other hand, is a train of pulses each having a duration (high or logical "1" level) eight times the duration of the pulses Pp. In the illustrated embodiment, whereas the charge pulses Pp and charge timing pulses Cp are individually fixed in phase, the vibrator drive pulses Vp have a phase which is shifted or varied depending on the shift register outputs 0-7 which are selectively produced by the data selector 64 in accordance with a count code output A-C of the counter 80. That is, the charge voltage pulse has a fixed phase while the separation phase of ink into droplets is shiftable.

Referring to FIGS. 1-4, for a phase search, a search command signal is made high or (logical) "1" so that a switching circuit (or relay) 82 connects the charge amplifier 78 to the charging electrode 22 and, at the same time, a deflection voltage source circuit 84 is deenergized (or switched off). In this situation, the amplifier 78 supplied the charging electrode 22 through the switching circuit 82 a train of negative constant level charging pulses which are synchronous with the phase search charging pulses Pp, which have a period of 10 μsec and repeatedly appear at the period of 320 μsec. Suppose that the output count code of the counter 80 is "000". Then, the pulses at the 0 output terminal of the shift register 62 will have been applied to the drive amplifier 66 as vibrator drive pulses Vp. The ink, therefore, separates into droplets at a phase which corresponds to the period and phase (relative to the phase of the pulses Pp) of the drive pulses Vp. If this separation is accurately timed to the pulses Pp, the ink droplets are charged to the positive polarity and hit against the gutter 28. Thus, a set of sixteen ink droplets are charged and the next set of sixteen ink droplets are left non-charged; the resultant charge pattern has the period of 320 μsec. All the ink droplets therefore are caused to impinge on the gutter 28. This causes the gutter potential to fluctuate in the same manner as the charge pattern. Meanwhile, the base potential of the field effect transistor 48 of the charge detector 44 undergoes a fluctuation along a sinusoidal wave or an envelope at the period of 320 μsec due to the floating capacity of the shielding wire 42 and the time constant of the resistor 46 of the charge detector 44. The voltage having such a sinusoidal wave is inverted by the transistor 48 and then inverted and amplified by the operational amplifier 50, thus being fed to the high-pass filter 52 at the positive level. The high-pass filter 52 functions to check noise whose period is short of 320 μsec. The integrator 54 smoothes the sinusoidal wave of 320 μsec period to stabilize it at a constant dc level. The comparator 56 compares the dc voltage with a reference voltage. If the dc voltage is higher than the reference voltage, the output of the comparator 56 is "0" indicating that an ink droplet has been charged. The comparator output turns to "1" if an ink droplet has not been charged or has been charged incompletely.

Figure 5A:
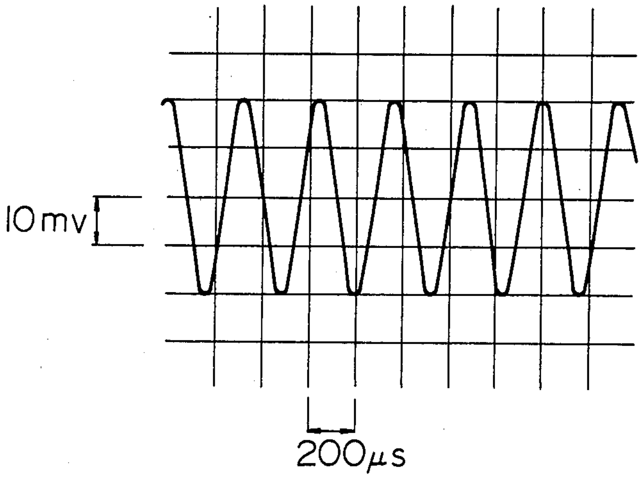
FIGS. 5*a* and 5*b* show waveforms measured by the charge detection circuit.
Figure 5B:
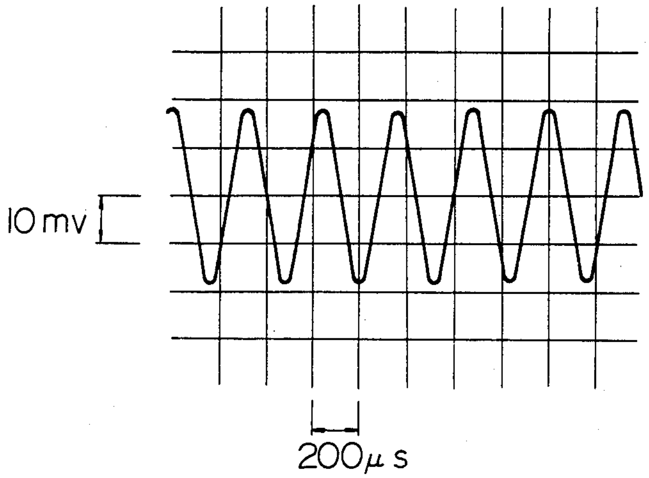

FIGS. 5*a* and 5*b* show output waveforms of the high-pass filter 52 of the charge detector 44. The curve of FIG. 5*a* represents a result of measurement under the empty condition of the gutter holder 38 and tube 40, and the curve of FIG. 5*b* a result of measurement under the filled condition of the same. It will be seen from these curves that the amplified voltage level little differs from the empty condition to the filled condition; it hardly fluctuates in a usual operation because the ink will be sucked by the pump 32 with the inner surfaces of the gutter holder 38 and tube 40 kept wet.

The output of the comparator 56 is coupled to a print control unit (not shown) and an AND gate 86 included in the phase control circuit 58. The print control unit makes the phase search signal "1" and then supplies the AND gate 86 with phase discrimination pulses Pdk at a period of 10 μsec. When the output Pok of the comparator 56 becomes "0" indicating that an ink droplet has been charged, the print control unit stops producing the pulses Pdk to start on a print charge control. Thus, while the output level of the comparator 56 is "1" indicating no charge on ink droplets, the AND gate 86 supplies the counter 80 with one pulse at every 10 μsec so that the counter 80 is incremented by one and the data selector 64 produces a pulse coupled thereto from the "i+1" terminal of the shift register 64 instead of a pulse from the "i" terminal (meaning one step of phase shift). The counter 80 is incremented in a circulating manner. While pulses from one of the terminals 0-7 of the shift register 62 are fed as drive pulses Vp to the drive amplifier 66, ink droplets will become charged to make the output of the comparator 56 "0". As the output of the comparator 56 turns from "1" to "0" during a phase search, the print control unit makes its phase search command "0" to condition the system for a printing operation mode. For the printing operation mode, the switching circuit 82 connects the amplifier 88 to the charging electrode 22, the field effect transistor 46 is turned on, and the deflection voltage source 84 is switched on to supply the deflection electrode 24*b* with a predetermined positive or negative high voltage. The print signal generator 74 generates a voltage whose level varies in steps. This voltage is fed to the amplifier 88 while the pulse Cp is "0" and the print data is "1" commanding a printing operation.

When the field effect transistor 46 is turned on as previously mentioned, the conductive gutter 28 is grounded via the shielding wire 42 and transistor 46. This maintains the gutter potential at the ground level and prevents the gutter 28 from charging up, thereby avoiding disturbance to the deflection of the charged ink droplets.

Though in the above embodiment the phases of the phase search charging pulses Pp and charge timing pulses Cp are fixed and the separation phase of ink is shifted, the former may be shifted with the latter fixed if desired.

Figure 6B:
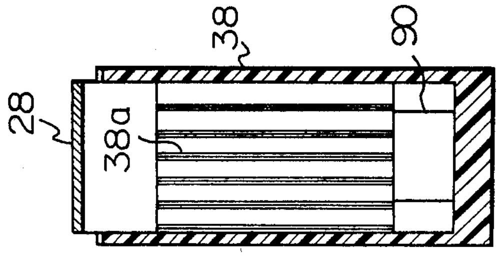
FIG. 6*b* is a section along line VIA—VIA of FIG. 6*a;*
Figure 6A:
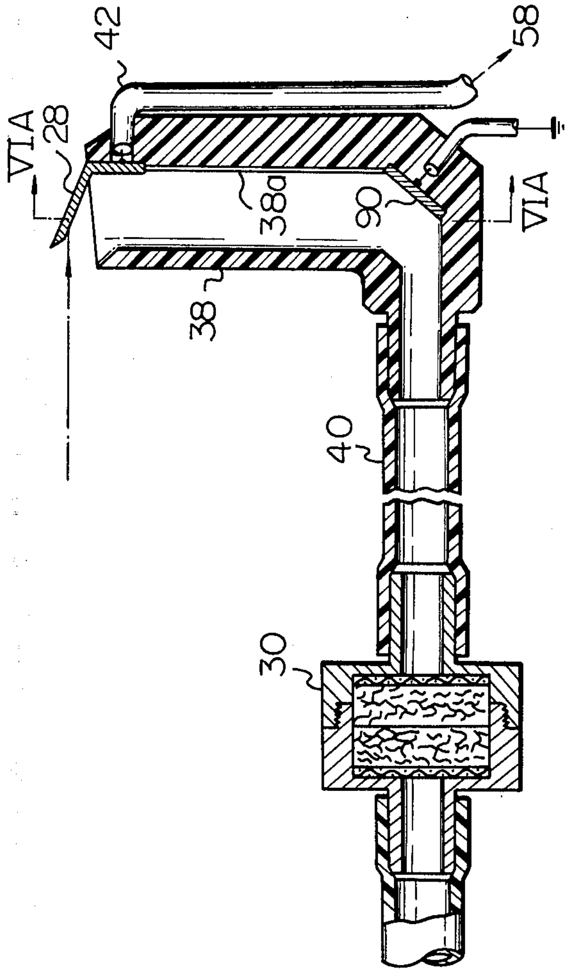
FIG. 6*a* is a vertical section showing a gutter and its associated members.
Figure 6C:
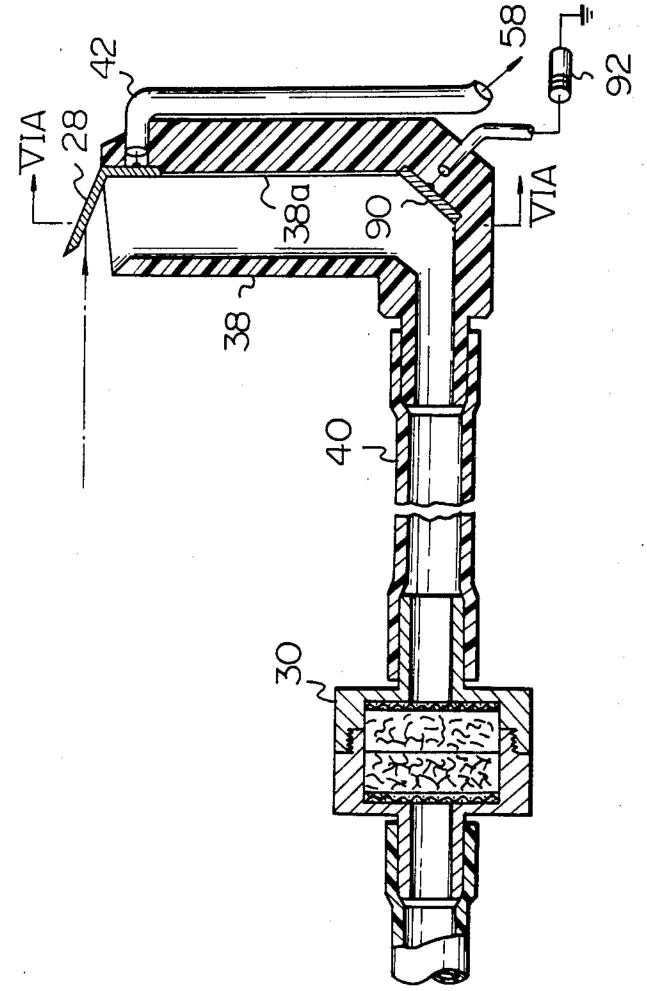
FIG. 6*c* is a vertical section showing a modified example of the gutter and its associated members.

Referring to FIGS. 6*a* and 6*b*, the gutter holder 38 carrying the gutter 28 therewith is formed with a plurality of vertically extending grooves 38*a* on that part of its inner wall which is located below the gutter 28. A ground plate 90 is fitted to the inner wall of the gutter holder 38 just below the grooves 38*a*. With this arrangement, ink droplets impinged on the gutter 28 flow down along the grooves 38*a* and ground plate 90 to reach the tube 40. Therefore, despite any random distribution of ink accumulation or any smearing between the gutter 28 and the ground plate 90, the electric resistance is dependent on the resistance of the ink flowing as constant streams along the grooves 38*a* and, therefore, substantially constant. If desired, the ground plate 90 may be grounded through a resistor 92 as shown in FIG. 6*c*.

Figure 7:
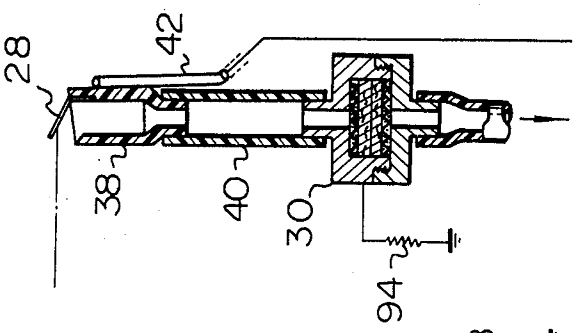
FIG. 7 is a vertical section showing still another modified example of the gutter and its associated members.

Various other modifications are possible concerning the gutter 28 and its associated members. For example, as shown in FIG. 7, the ink may be grounded through a resistor 94 or, alternatively, the gutter 28 may be grounded through a resistor. In any case, grounding the gutter 28 through a resistor will render the charge detecting voltage stable and grounding the detection circuit side of the shielding wire through the resistor 46 will further stabilize the charge detecting voltage.

Figure 8:
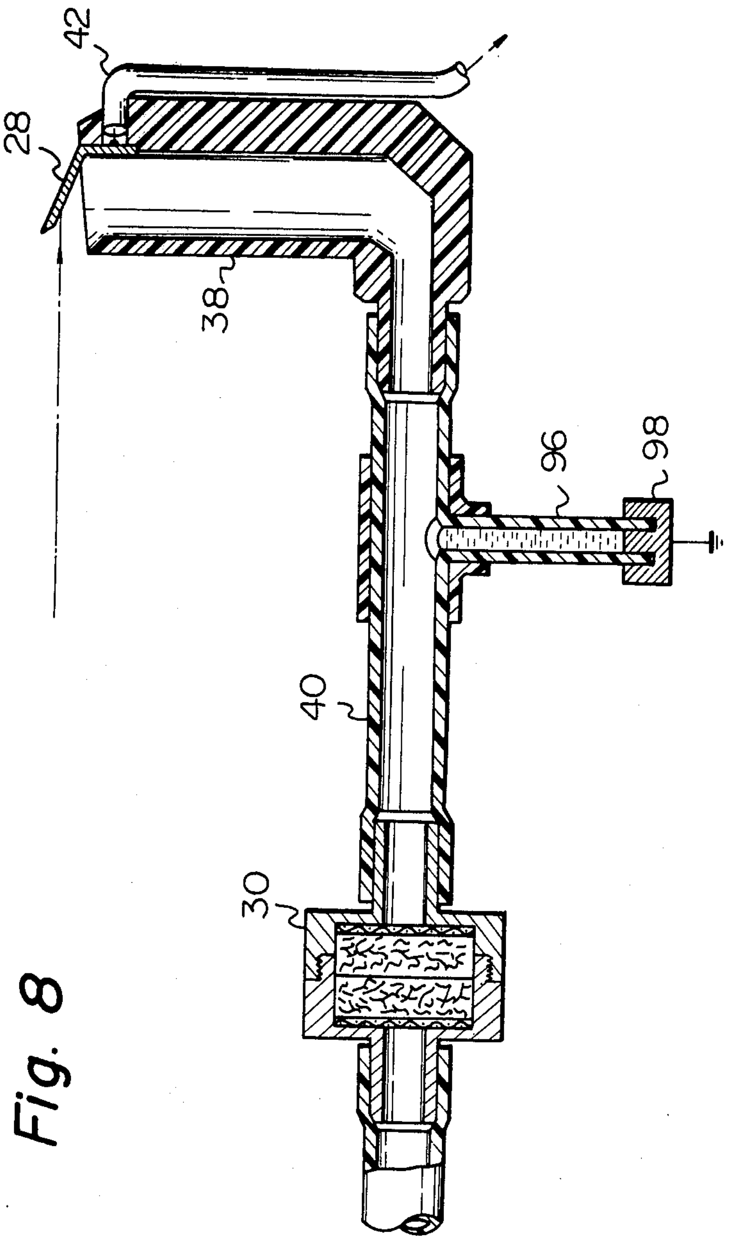
FIG. 8 is a vertical section showing a farther modified example of the gutter and its associated members.

Another modified form of the gutter arrangement is shown in FIG. 8. As shown, a tube section 96 branches off the insulating tube 40 which connects to the gutter holder 38. The end of the tube section 96 is stopped by a ground cap 98. The tube section 96 and the ink filled therein constitute a resistor in combination. The length and inside diameter of the tube section 96 are designed to match with a desired resistance. When the cap 98 is removed, the tube section 96 can serve as a drain to facilitate cleaning of the filter 30, gutter 28 or gutter holder 38. Apart from such modifications, ink in a branch tube for another purpose which provides a predetermined resistance may be regarded as a resistor and grounded.

Figure 9:
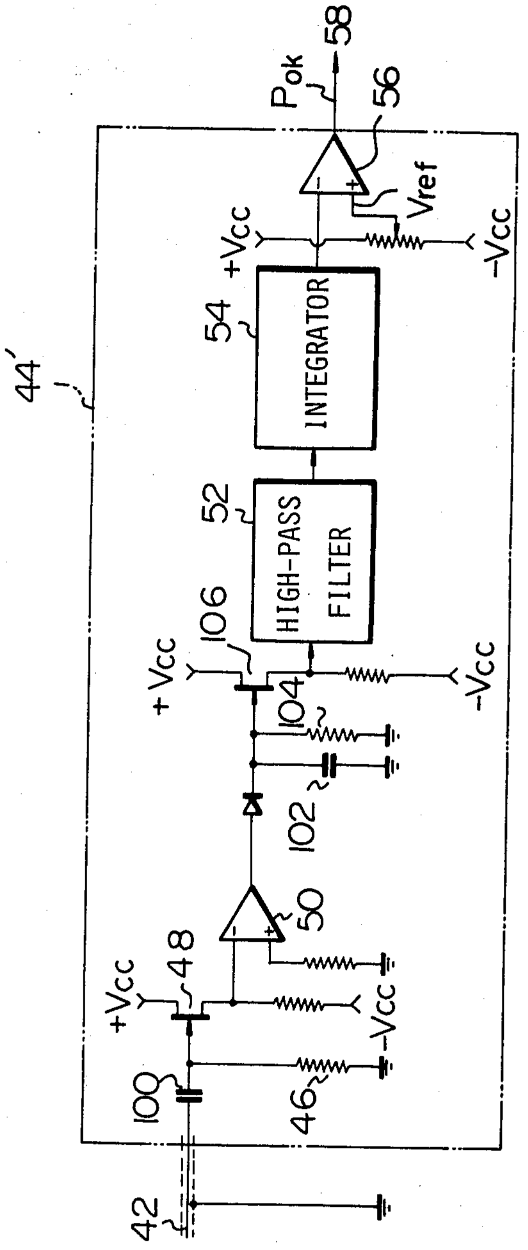
FIG. 9 is a circuit diagram representing another example of the charge detection circuit.

Referring to FIG. 9, a modified charge detection circuit designated by the reference numeral 44' includes a capacitor 100 connected between the shielding wire 42 and the field effect transistor 48. The output of the amplifier 50 is coupled to the base of a field effect transistor 106 through a low-pass filter which is constituted by a capacitor 102 and a resistor 104. The transistor 106 connects to the high-pass filter 52. The capacitor 100 cuts off dc bias components as would result from a frictional charge on the ink at the nozzle of the head 18 or a charge at the gutter 28 upon impingement as previously discussed. The discharge current of the charge deposited by the charging signal flows through the resistor 46 in a pulse form. The output of the amplifier 50, therefore, forms pulses each corresponding to a specific charge on an ink droplet. Where this type of charge detector 44' is employed, the shielding where 42 for connecting the capacitor 100 with the gutter 28 needs be short enough to suppress the floating capacity down to 20–30 pF or less. The time constant T of the low-pass filter 102, 104 is preselected to have the following relation with the intermittently occurring sixteen pulse train Pp:

$$10\ \mu\text{sec} < T < 10 = 16\ \mu\text{sec}.$$

With this relation, the high-pass filter 52 is supplied with a signal of the period of the sixteen pulses. The high-pass filter 52 cuts off low-frequency noise from the input signal to produce a shaped sinusoidal wave. The integrator 54 converts the sinusoidal wave to a dc level.

Figure 10:
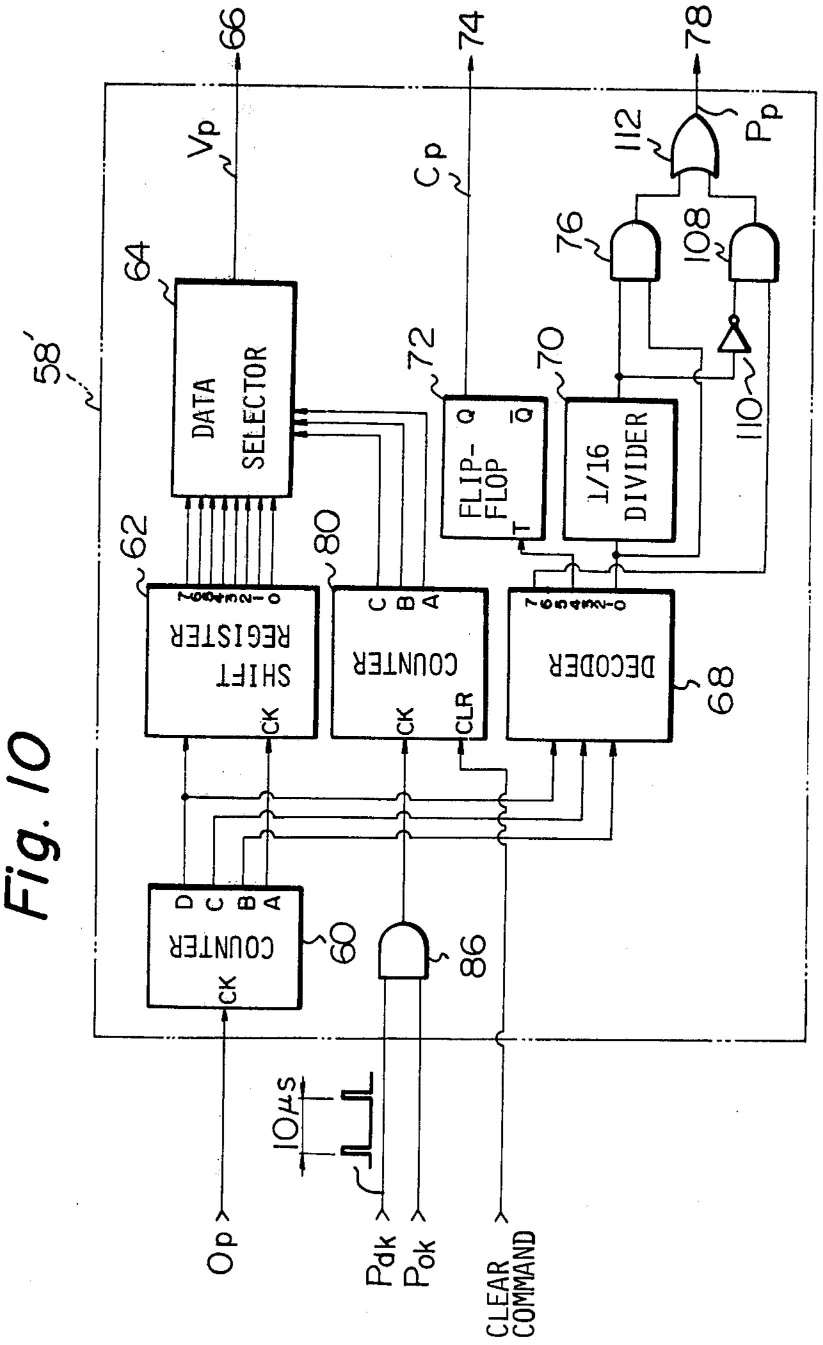
FIG. 10 is a block diagram showing another example of the phase control circuit.
Figure 11A:
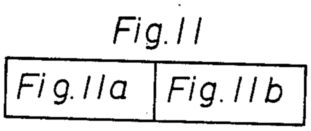
FIG. 11 is a timing chart demonstrating an operation of the phase control circuit of FIG. 10.
Figure 11A:
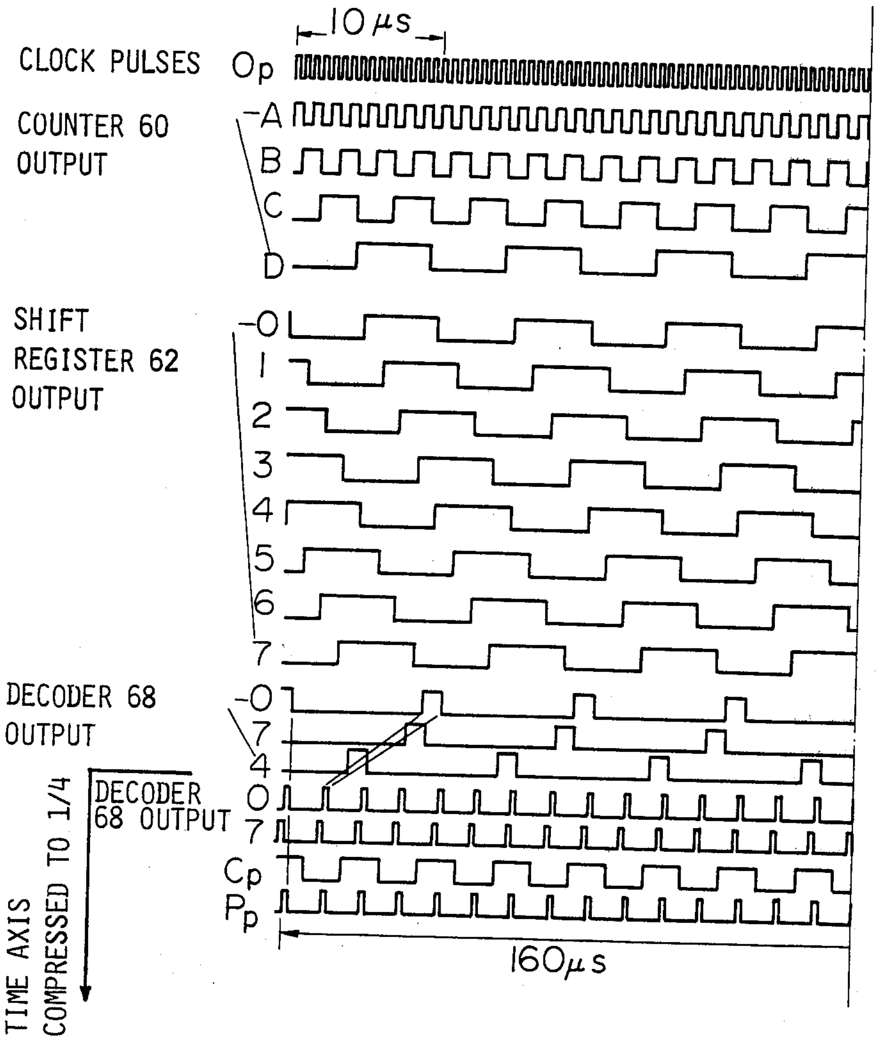
Figure 11B:
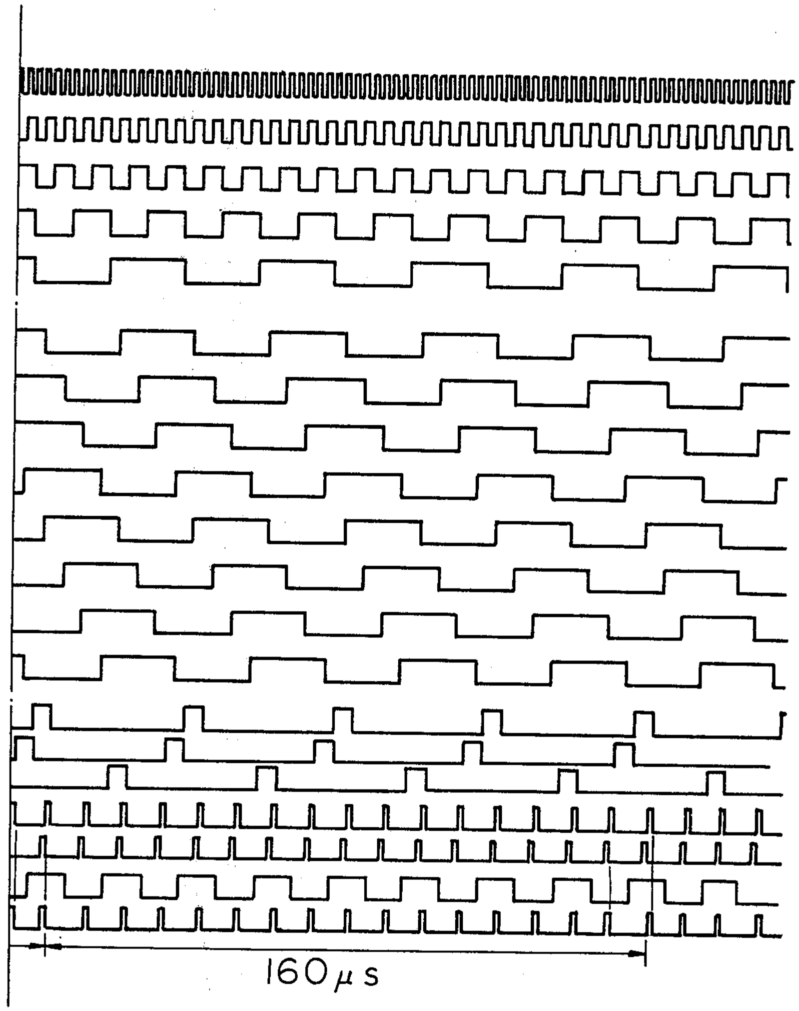

Referring to FIG. 10, another example of the phase control circuit 58 is illustrated. FIG. 11 is a timing chart which demonstrates an operation of the circuitry of FIG. 10. A phase control circuit 58' additionally includes an AND gate 108, an inverter 110 and an OR gate 112. As seen in FIG. 11, charge pulses Pp occur in a continuous manner with a period of 320 μsec, sixteen successive pulses from the 0 output terminal and then sixteen successive pulses from the 7 output terminal without interruption. A voltage induced in the gutter 28 by a voltage pulse synchronous with the pulse signal Pp and fed to the charging electrode 22 is smoothed by the floating capacity of the shielding wire 42, and the resistances $R_G$, $R_C$ into a constant level dc voltage (noise voltage), which is then checked by the high-pass filter 52. As long as ink droplets are charged by the pulse signal Pp appearing at either one of the output terminals 0 and 7 of the decoder 68, a sinusoidal voltage fluctuation of a 320 μsec period occurs at the resistor 46 and is passed to the integrator 54 via the high-pass filter 52. The integrator 54 rectifies and smoothes the input voltage fluctuation to a predetermined level. While the ink droplets are charged by all the pulse signals Pp, the voltage across the resistor 46 does not pulsate so that it is not applied to the integrator 54.

It will be understood that the phase control circuit shown in FIG. 10 overcomes the problem heretofore pointed out that a high-frequency noise voltage is induced in a conductive gutter and/or collected ink by charging voltage pulses and undergoes a fluctuation at a same period as the charging voltage pulses, resulting in a noise distribution similar to an RC-smoothed waveform of the discharge current of ink droplets.

The circuitry of FIG. 10 attains a phase detection control of an accuracy which is $\frac{1}{4}$ in phase of the drive period. To achieve an accuracy of $\frac{1}{8}$ in phase, the decoder 68 may be designed to produce a signal divided to 1/16. Again, the drive phase (separation phase of ink) may be fixed and the pulse signal Pp may be shifted in phase such that the timing signal Cp is shifted in phase in correspondence with the pulse signal Pp.

Figure 12:
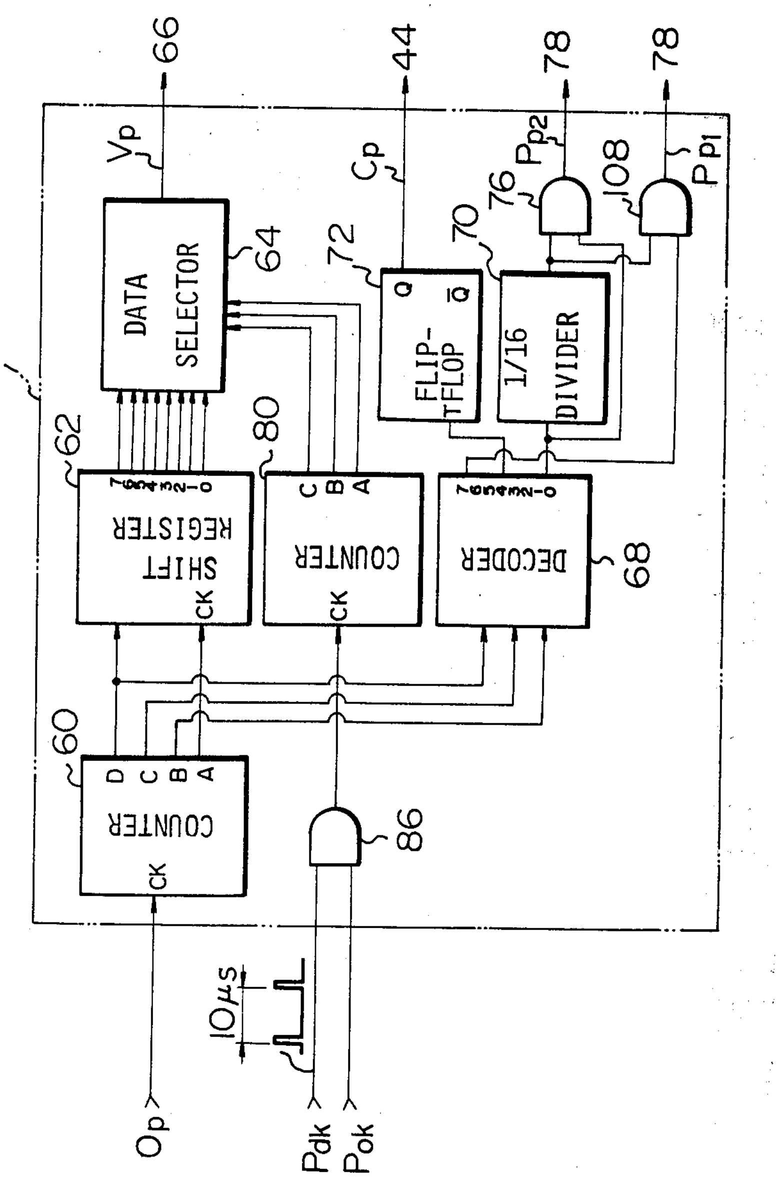
FIG. 12 is a block diagram showing still another example of the phase control circuit.
Figures 13, 13A:
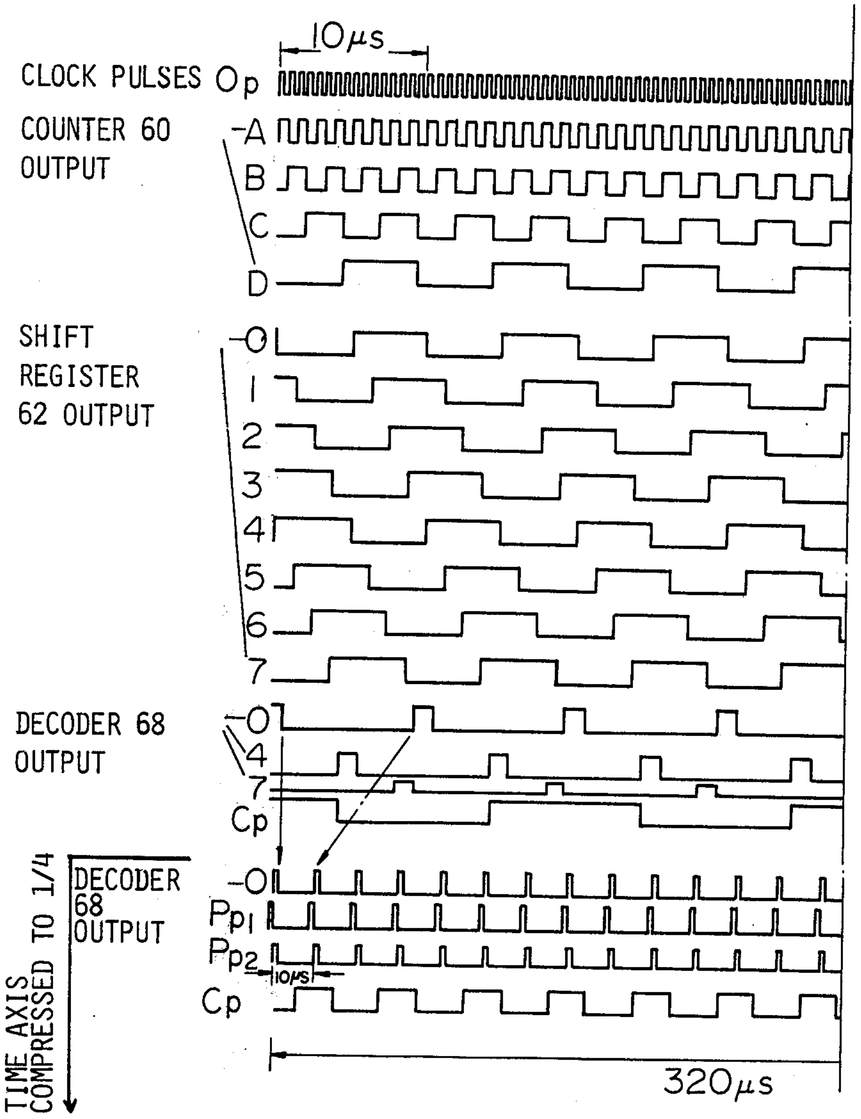
FIG. 13 is a timing chart demonstrating an operation of the phase control circuit of FIG. 12.
Figure 13B:
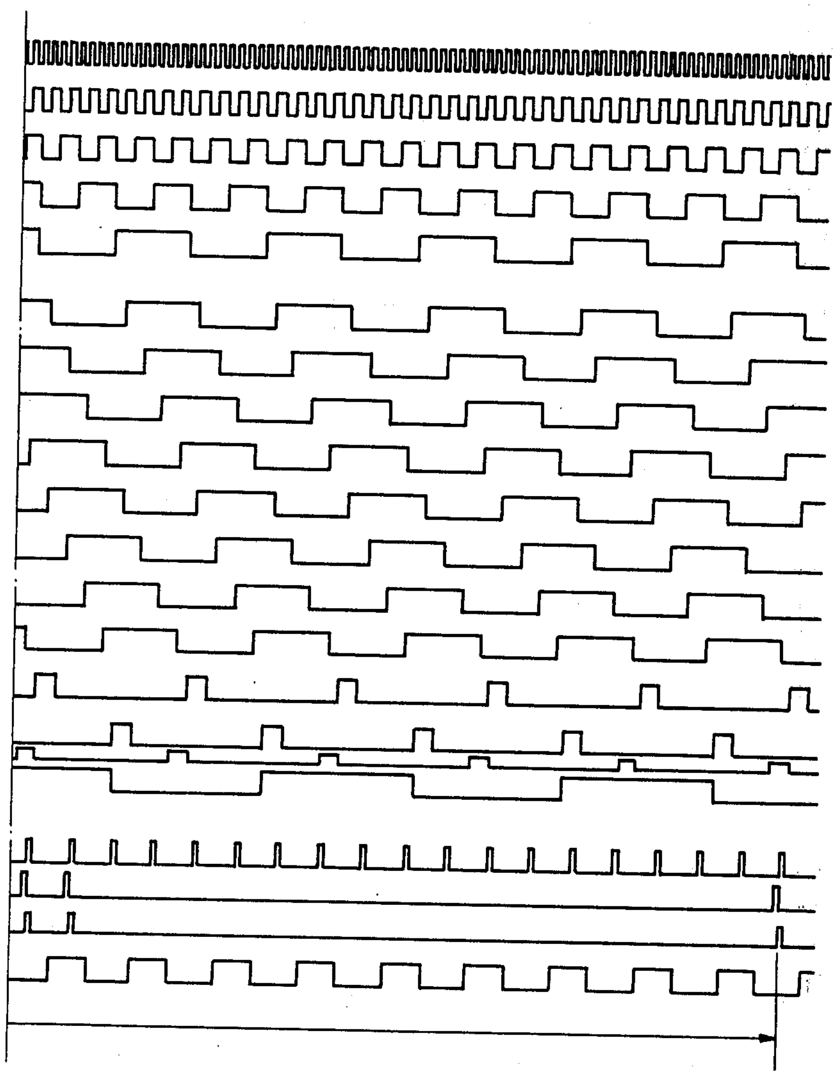

Referring to FIGS. 12 and 13, still another example of the phase control circuit will be described. A phase control circuit 58'' is constructed to couple the B-D output bits of the counter 60 to the decoder 68 and the output pulses at the first output terminal 0 and the fifth output terminal 4 of the decoder 68 to the frequency divider 70 and T-type flip-flop 72, respectively. The Q output of the flip-flop 72 is supplied to the print signal generator 74 as the charge timing signal Cp. Pulses divided by the frequency divider 70 to 1/16 and shaped by the AND gate 76 to the duration of output pulses at the 0 terminal of the decoder 68 are supplied to the charge amplifier 78 as phase search charging pulses Pp2. Meanwhile, pulses divided by the frequency divider 70 to 1/16 and shaped by an AND gate 108 are coupled to the charge amplifier 78 as another group of phase search charging pulses Pp1. In each of the charging signals Pp1, Pp2, a train of sixteen successive pulses is followed by an interruption corresponding to the same number of pulses and this is repeated at a period of 320 μsec. In contrast, the charge timing signal for printing Cp is a continuous train of pulses each having a duration (high or "1" level) which is eight times the duration of the pulses Pp1, Pp2 with the latter occurring substantially at the center of the former.

In the embodiment shown in FIGS. 12 and 13, while each of the phase search charging pulses Pp1, Pp2 and print charge timing pulse Cp has a fixed phase, the phase of the vibrator drive pulses Vp is shifted or varied depending on the shift register outputs 0-7 which the data selector 64 selectively produce in accordance with a count code output A-C of the counter 80. In short, charging voltage pulses are fixed in phase but the separation phase of ink is shifted.

Figure 14A:
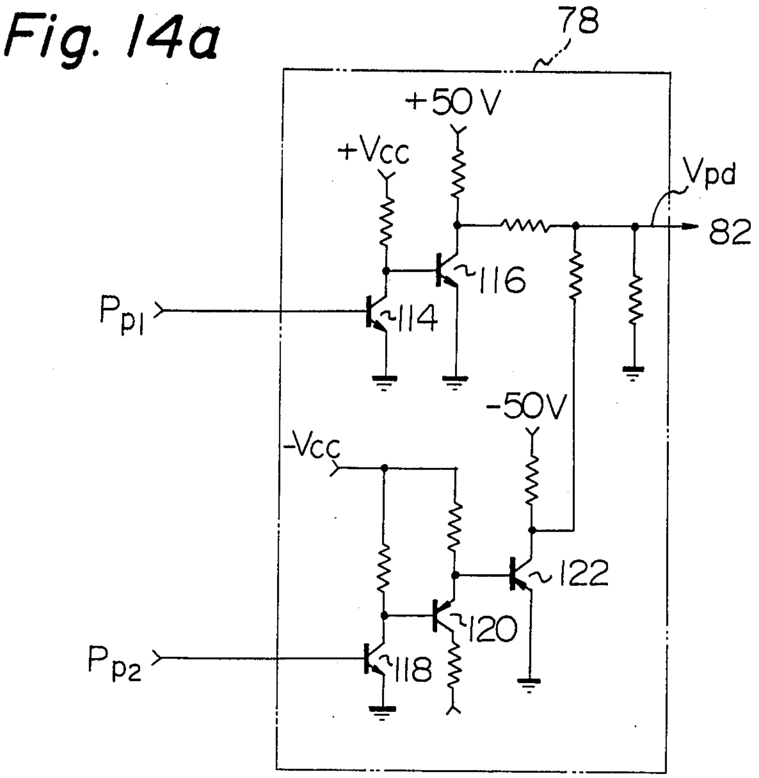
FIG. 14*a* is a circuit diagram showing an example of an amplifier.
Figure 14B:
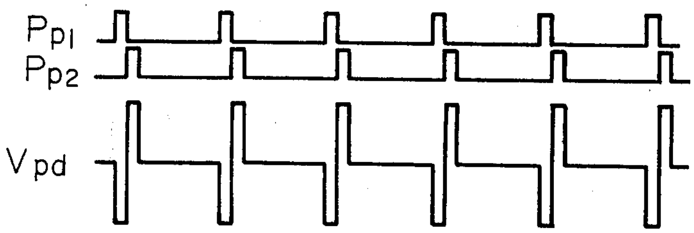
FIG. 14*b* is a timing chart showing an operation of the amplifier of FIG. 14*a;*

FIG. 14*a* illustrates a detailed construction of the amplifier 78 adapted to amplify the phase search charging pulses Pp1, Pp2 to produce a charging voltage. An operation of the amplifier 78 is demonstrated in FIG. 14*b*. As shown, pulse Pp1 is fed to the base of a transistor 114 to turn this transistor on. A second transistor 116 is turned on and off in unison with the transistor 114 to amplify the pulse Pp1 to the +50 V level. A pulse Pp2 is amplified to the −50 V level by transistors 118, 120, 122. As a result, the charging electrode 22 during a phase search is supplied with voltage pulses Vpd of opposite polarities.

In the phase searching operation described above, the charging voltage pulses having both the positive and negative polarites allow the voltage induced in the gutter 28 or the collected ink to alternate and, due to the high frequency, the voltage is RC-smoothed by the floating capacity of the shielding wire 42 and resistor 46 substantially to the zero level and does not appear in the output of the high-pass filter 52.

Figure 15A:
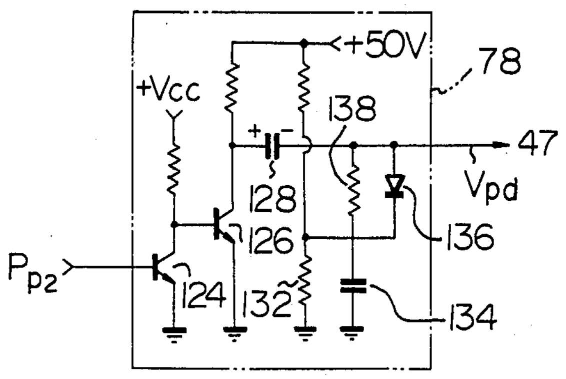
FIG. 15*a* is a circuit diagram showing another example of the amplifier.
Figure 15B:
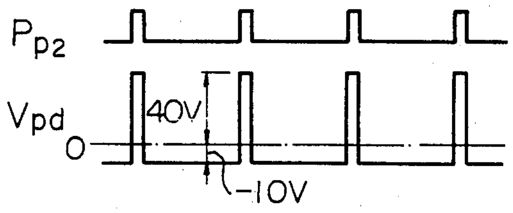
FIG. 15*b* is a timing chart showing an operation of the amplifier of FIG. 15*b.
Figure 15C:
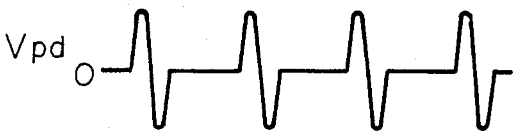
* and FIG. 15*c* is a timing chart showing an output of a modification to the amplifier of FIG. 15*a.*

Referring to FIGS. 15*a*–15*c*, there is shown another example of the charge amplifier 78. Let it be assumed that the phase control circuit 58 is of the type shown in FIG. 3*a* which produces only one group of phase search charging signal Pp (=Pp2), and that the amplifier 78 produces pulses which rises from a negative level to a positive level as viewed in FIGS. 15*a* and 15*b*. FIG. 15*c* is a timing chart demonstrating an operation of the amplifier 78. When the pulse Pp2 is at the positive level, a transistor 124 is turned on and a transistor 126 turned off whereby the voltage pulse Vpd is made positive in level via a capacitor 128. Resistors 130, 132 have a resistance relation of 130/132=¼. Thus, when the voltage at the resistor 132 and a capacitor 134 is +40 V and the pulse Pp2 turns to the low level (ground level), the positive side of the capacitor 128 at +50 V is forcibly grounded upon turn-on of the transistor 126 so that the negative side is made −50 V. Since the negative side of the capacitor 128 is connected to the resistor 132 and capacitor 134 by a diode 136, the output Vpd generally equals to −50 V+40 V=10 V. Thus, phase search charging pulses of opposite polarities alternate each other and the resultant induced noise is smoothed by the floating capacity of the shielding wire and resistor 46 substantially to the zero level, preventing the high-pass filter 52 from producing noise. In the circuitry of FIG. 15*a*, the resistors 130, 132, capacitor 134 and diode 136 may be omitted with the resistor 138 grounded. This alternative arrangement will provide the output voltage Vpd with a waveform shown in FIG. 15*c*.

Again, while in this embodiment all the pulses Pp1, Pp2, Cp are fixed in phase and the separation phase of ink is shifted, the former may be shifted with the latter fixed if desired.

Various modifications will become possible for those skilled in the art after receiving the teachings of the present disclosure without departing from the scope thereof.

What is claimed is:

1. An ink jet printing apparatus comprising:

an ink ejection head for ejecting a jet of ink;

charging means for electrostatically and selectively charging ink droplets separated from the jet of ink;

deflection means for electrostatically deflecting the charged ink droplets;

charging pulse generator means for generating charging voltage pulses for a phase search and applying the voltage pulses to the charging means intermittently at a predetermined period;

gutter means comprising an upper conductive member for catching the charged ink droplets for the phase search, a lower conductive member which is connected to ground and passageway means formed of an electrically insulative material operatively connected between the upper and lower conductive members, the passageway means in combination with ink flowing downwardly therethrough constituting resistance means through which the upper conductive member is grounded; and charge detection means for detecting a voltage appearing across the resistance means at said predetermined period when the charged ink droplets impinge on the conductive member of the gutter means to be discharged through the resistance means.

2. An apparatus as claimed in claim 1, further comprising means for generating drive pulses for separating the jet of ink into droplets, said predetermined period being at least two times the period of a drive frequency of the drive pulses.

3. An apparatus as claimed in claim 1, in which said phase search charging voltage pulses supplied to the charging means have both the positive and negative polarities.

4. An apparatus as claimed in claim 1, further comprising means for amplifying said voltage which appears across the resistance means.

5. An apparatus as claimed in claim 4, further comprising filter means for filtering or cutting off a noise component contained in the amplified voltage.

6. An apparatus as claimed in claim 4, further comprising a shielded wire for connecting the amplifying means and the upper conductive member to each other.

7. An apparatus as claimed in claim 1, further comprising a resistor connected between the lower conductive member and ground.

8. An apparatus as claimed in claim 1, in which the gutter means further comprises a resistance body which is connected between the lower conductive member and ground.

9. An apparatus as claimed in claim 8, in which the gutter means further comprises an ink collection passageway, the resistance body between the lower conductive member and ground being ink filled in an ink well which branches off the ink collection passageway.

10. An apparatus as claimed in claim 8 in which the resitance means has a resistance which is sufficiently smaller than the sum of the resistance of collected ink and that of the resistance body interposed between the lower conductive member and ground.

11. An ink jet printing apparatus comprising:
an ink ejection head for ejecting a jet of ink;
charging means for electrostatically and selectively charging ink droplets separated from the jet of ink;
deflection means for electrostatically deflecting the charged ink droplets;
charging pulse generator means for generating charging voltage pulses for a phase search and applying the voltage pulses to the charging means intermittently at a predetermined period;
gutter means for catching the charged ink droplets for the phase search, said gutter means comprising a conductive member and resistance means through which the conductive member is grounded; and
charge detection means for detecting a voltage appearing across the resistance means at said predetermined period when the charged ink droplets impinge on the conductive member of the gutter means to be discharged through the resistance means;
the gutter means further comprising a casing made of an insulating material and supporting the conductive member, said casing being formed with a plurality of vertically extending grooves in a portion of its inner wall below the conductive member, and a conductive body grounded and so located as to be engaged by the collected ink which flows in and along said grooves.

12. An apparatus as claimed in claim 11 in which the gutter means further comprises a resistance body which is connected between the conductive body and the ground.

13. An apparatus as claimed in claim 12 in which the gutter means further comprises an ink collection passageway, the resistance body between the conductive body and the ground being the ink filled in an ink well which branches off the ink collection passageway.

14. An apparatus as claimed in claim 12 in which the resistance means has a resistance which is sufficiently smaller than the sum of the resistance of the collected ink and that of the resistance body interposed between the conductive member and the ground.

* * * * *